(12) United States Patent
Funaki (10) Patent No.: US 7,560,635 B2
(45) Date of Patent: Jul. 14, 2009

(54) MUSICAL INFORMATION DISPLAY APPARATUS, MUSICAL INFORMATION DISPLAY METHOD, AND PROGRAM FOR IMPLEMENTING THE METHOD

(75) Inventor: Tomoyuki Funaki, Hamamatsu (JP)

(73) Assignee: Yamaha Corporation (JP)

( * ) Notice: Subject to any disclaimer, the term of this patent is extended or adjusted under 35 U.S.C. 154(b) by 244 days.

(21) Appl. No.: 11/211,154

(22) Filed: Aug. 24, 2005

(65) Prior Publication Data

US 2006/0065101 A1   Mar. 30, 2006

(30) Foreign Application Priority Data

Aug. 24, 2004   (JP) .............................. 2004-243725

(51) Int. Cl.
*G09B 15/08* (2006.01)

(52) U.S. Cl. ...................... 84/478; 84/477 R (58) Field of Classification Search ............ 84/478, 84/477 R
See application file for complete search history.

(56) References Cited

U.S. PATENT DOCUMENTS 6,025,551 A    2/2000  Munekawa et al.
6,087,577 A *  7/2000  Yahata et al. ............... 84/478
6,486,388 B2 * 11/2002 Akahori ....................... 84/478
6,555,737 B2 *  4/2003  Miyaki et al. ............. 84/477 R
7,238,876 B1 *  7/2007  Worrall et al. ............... 84/722

FOREIGN PATENT DOCUMENTS

JP    10-207346 A    8/1998
JP    11-85145 A     3/1999
JP    2002-323890 A  11/2002

OTHER PUBLICATIONS

Office Action dated Feb. 10, 2009, issued in corresponding Japanese Application No. 2004-243725. English translation provided.

\* cited by examiner

*Primary Examiner*—Jeffrey Donels
*Assistant Examiner*—Jianchun Qin
(74) *Attorney, Agent, or Firm*—Rossi, Kimms & McDowell LLP (57) ABSTRACT

A musical information display apparatus which makes it possible to additionally display fingering information such that it can be easy to see. A sequence of note data and fingering information corresponding to respective pieces of the note data are supplied, and the supplied note data is displayed on a display. Fingering display information indicative of whether to display the fingering information is stored in association with the respective pieces of the supplied note data. The fingering information corresponding to the respective pieces of the displayed note data is displayed in accordance with the stored fingering display information.

9 Claims, 9 Drawing Sheets

MUSICAL INFORMATION DISPLAY APPARATUS, MUSICAL INFORMATION DISPLAY METHOD, AND PROGRAM FOR IMPLEMENTING THE METHOD

BACKGROUND OF THE INVENTION

1. Field of the Invention

The present invention relates to a musical information display apparatus and a musical information display method that display fingering information and finger movement information, as well as a program for implementing the method.

2. Description of the Related Art

Conventionally, there has been known an apparatus that analyzes a sequence of notes and automatically generates fingering information for the respective notes (see Japanese Patent No. 2,950,138, for example). This apparatus generates fingering information such that a difficult finger movement such as crossing of one finger under another occurs to the least possible degree, or even if such a difficult finger movement occurs, it occurs as late as possible.

Also, there has been conventionally known an apparatus that displays information related to notes at positions adjacent to the respective notes (see Japanese Laid-Open Patent Publication (Kokai) No. 2002-323890, for example).

With a combination of the above conventional apparatuses, it is possible to easily develop an apparatus that displays fingering information at positions adjacent to respective notes included in a sequence of notes.

However, in the apparatus that can be developed with a combination of the above conventional apparatuses, a large amount of information is displayed because fingering information is displayed in addition to all the notes included in a sequence of notes, and therefore, what is displayed cannot always be easily seen by a user.

Also, the fingering information is displayed in the form of numbers or symbols representing the sorts of fingers, and therefore, particularly in the case where the user is a beginner, he/she cannot easily read finger movements such as crossing of one finger under another, crossing of one finger over another, and finger substitution by referring to the displayed fingering information.

SUMMARY OF THE INVENTION

It is an object of the present invention to provide a musical information display apparatus and a musical information display method that make it possible to additionally display fingering information such that it can be easy to see, as well as a program for implementing the method.

To attain the above object, in a first aspect of the present invention, there is provided a musical information display apparatus comprising a supplying device that supplies a sequence of note data and fingering information corresponding to respective pieces of the note data, a display device that displays the note data supplied by the supplying device, and a fingering display information storage device that stores fingering display information indicative of whether to display the fingering information in association with the respective pieces of the supplied note data, wherein the display device displays the fingering information corresponding to the respective pieces of the displayed note data in accordance with the fingering display information stored in the fingering display information storage device.

Here, the "note data" includes at least pitch information and reproduction timing information, and may further include tone length information and intensity information (velocity). The "fingering information" may be either information included in each piece of "note data" or information stored in association with each piece of "note data." The "fingering information" may be information given to each piece of "note data" from the beginning, or may be information detected from a supplied sequence of note data by a known fingering information detecting method and given to each piece of "note data."

With the arrangement of the first aspect of the present invention, a sequence of note data and fingering information corresponding to respective pieces of the note data are supplied, the supplied pieces of the note data are displayed, and fingering information corresponding to the displayed respective pieces of the note data is displayed in accordance with fingering display information stored in the fingering display information storage device. As a result, by storing in advance fingering display information in which the necessary part of the fingering information is set to "display" and the rest of the fingering information is set to "not display", in the fingering display information device, only the necessary fingering information can be displayed in addition to the note data.

Preferably, the musical information display apparatus further comprises a selecting device that selects part of the supplied note data, and a fingering display information setting device that makes setting such that in the fingering display information, fingering information corresponding to the part of the note data selected by the selecting device is set to "display", and fingering information corresponding to the rest of the note data is set to "not display."

Here, the "selecting device" can be implemented by user's selecting operation on a screen on which a score or a piano roll is displayed, or by user's editing operation on a setting screen such as a dialogue. Also, automatic selection in accordance with an algorithm in which, for example, all of note data at the leading ends of bars and immediately after rests are selected can be envisaged to implement the "selecting device."

More preferably, the musical information display apparatus further comprises a detecting device that detects note data corresponding to at least one performance operator to be operated by at least one predetermined finger movement from the supplied note data and fingering information, and the selecting device selects the note data detected by the detecting device as the part of the note data.

Examples of the "predetermined finger movement" include "beginning of playing", "finger substitution", "crossing of one finger under another", "crossing of one finger over another", and "starting from the same finger."

More preferably, the musical information display apparatus further comprises a finger movement information storage device that stores finger movement information indicative of movement of a finger that is to operate a performance operator corresponding to each piece of the supplied note data in association with the piece of the supplied note data, and a finger movement information setting device that sets finger movement information on the note data detected by the detecting device as movement of a concerned finger, and stores the set finger movement information in the finger movement information storage device, and the display device displays the movement of the concerned finger in association with the note data for which the finger movement information has been set by the finger movement information setting device.

According to the preferred form of the present invention, note data corresponding to performance operators to be operated by predetermined finger movements is detected from the supplied note data and fingering information, and finger movement information on the detected note data is set as the concerned finger movements, which are then displayed in association with the note data for which the finger movement have been set. As a result, a user can understand finger movements at a glance even if he/she is a beginner.

To attain the above object, in a second aspect of the present invention, there is provided a musical information display method comprising a supplying step of supplying a sequence of note data and fingering information corresponding to respective pieces of the note data, a display step of displaying the note data supplied in the supplying step on a display device, and a fingering display information storage step of storing fingering display information indicative of whether to display the fingering information in association with the respective pieces of the supplied note data in a fingering display information storage device, wherein in the display step the fingering information corresponding to the respective pieces of the displayed note data is displayed in accordance with the fingering display information stored in the fingering display information storage device.

According to the second aspect of the present invention, the same effects as those obtained by the musical information display apparatus according to the first aspect can be obtained.

Further, to attain the above object, in a third aspect of the present invention, there is provided a program for causing a computer to execute the musical information display method according to the second aspect.

According to the third aspect of the present invention, the same effects as those obtained by the musical information display apparatus according to the first aspect can be obtained.

The above and other objects, features, and advantages of the invention will become more apparent from the following detained description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
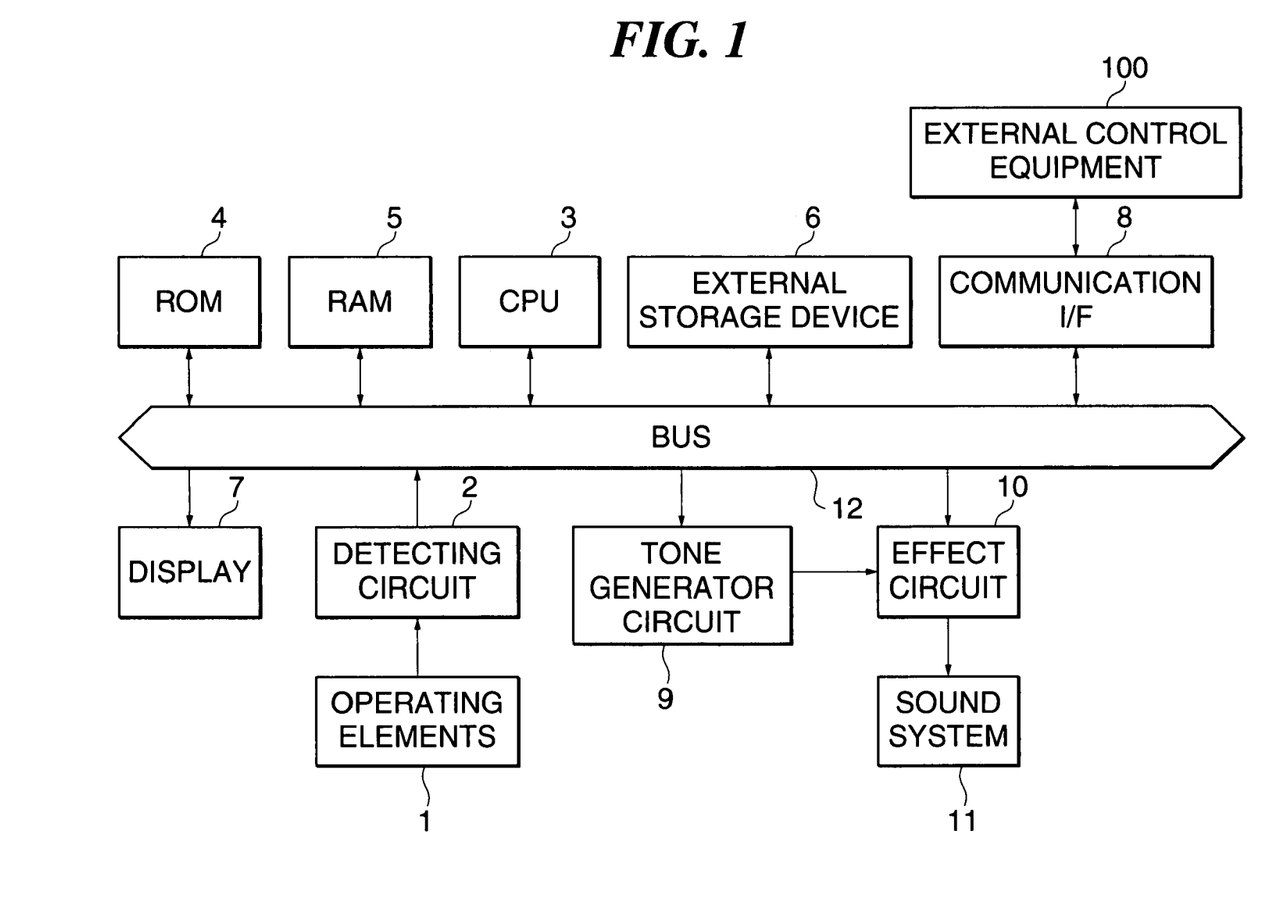
FIG. 1 is a block diagram schematically showing the construction of a musical information display apparatus according to an embodiment of the present invention.

FIG. 1 is a block diagram schematically showing the construction of a musical information display apparatus according to an embodiment of the present invention.

As shown in FIG. 1, the musical information display apparatus according to the present embodiment is comprised of a plurality of operating elements 1 including a keyboard for inputting characters, a pointing device such as a mouse, and various switches; a detecting circuit 2 for detecting operative states of the operating elements 1; a CPU 3 that controls the entire apparatus; a ROM 4 that stores control programs executed by the CPU 3, various table data, etc.; a RAM 5 for temporarily storing musical composition data, various input information, computation results, etc.; an external storage device 6 that stores various application programs including control programs, various musical composition data, various other data, etc.; a display 7 comprised of a liquid crystal display (LCD), light emitting diodes (LEDs), etc., for displaying various information and others; a communication interface (I/F) 8 that provides interface for connection to external control equipment 100 such as external MIDI (Musical Instrument Digital Interface) equipment and performs transmission and reception of data to and from the external control equipment 100; a tone generator circuit 9 that converts musical tone data generated based on the musical composition data stored in the external storage device 6 into musical tone signals; an effect circuit 10 that applies various effects to musical tone signals from the tone generator circuit 9; and a sound system 11 that converts musical tone signals from the effect circuit 10 into sounds and is comprised of a DAC (Digital-to-Analog Converter), an amplifier, a speaker, etc.

The above component elements 2 to 10 are connected to one another via a bus 12. The external control equipment 100 is connected to the communication I/F 8, the effect circuit 10 to the tone generator circuit 9, and the sound system 11 to the effect circuit 10, respectively.

The external storage device 6 may be implemented, for example, by a flexible disk drive (FDD), a hard disk drive (HDD), a CD-ROM drive, or a magnetic-optical disk drive (MO). The external storage device 6 may store the control programs executed by the CPU 3 as mentioned above. If one or more of the control programs are not stored in the ROM 4, the control program(s) may be stored in the external storage device 6, and by reading out the control program(s) from the external storage device 6 and storing the same in the RAM 5, the CPU 3 can operate in the same manner as if the control program(s) were stored in the ROM 4. This enables adding control programs and upgrading the version of the control programs with ease.

Although in the illustrated example, the external control equipment 100 is connected to the communication I/F 8, the present invention is not limited to this, but a server computer may be connected to the communication I/F 8 via a communication network such as a LAN (Local Area Network), the Internet, or a telephone line. When one or more of the above programs and various parameters are not stored in the external storage device 6, the communication I/F 8 is used to download such programs and parameters from the server computer. A computer (the musical information display apparatus in the present embodiment) as a client sends a command or commands for downloading one or more programs and parameters to the server computer via the communication I/F 8 and the communication network. Responsive to this command, the server computer distributes the requested program(s) and parameters to the computer via the communication network, and the computer receives the program(s) and parameters via the communication I/F 8 and stores them in the external storage device 6, thus completing the download.

Although the musical information display apparatus according to the present embodiment is constructed on a universal personal computer as will be understood from the above construction, the present invention is not limited to this, but the musical information display apparatus according to the present embodiment may be constructed on a dedicated apparatus comprised of the minimum elements that can practice the present invention.

A brief description will be given of control processes carried out by the musical information display apparatus constructed as described above with reference to FIGS. 2 and 3 first, and then a detailed description will be given of the control processes with reference to FIGS. 4A to 6B.

Figure 2:
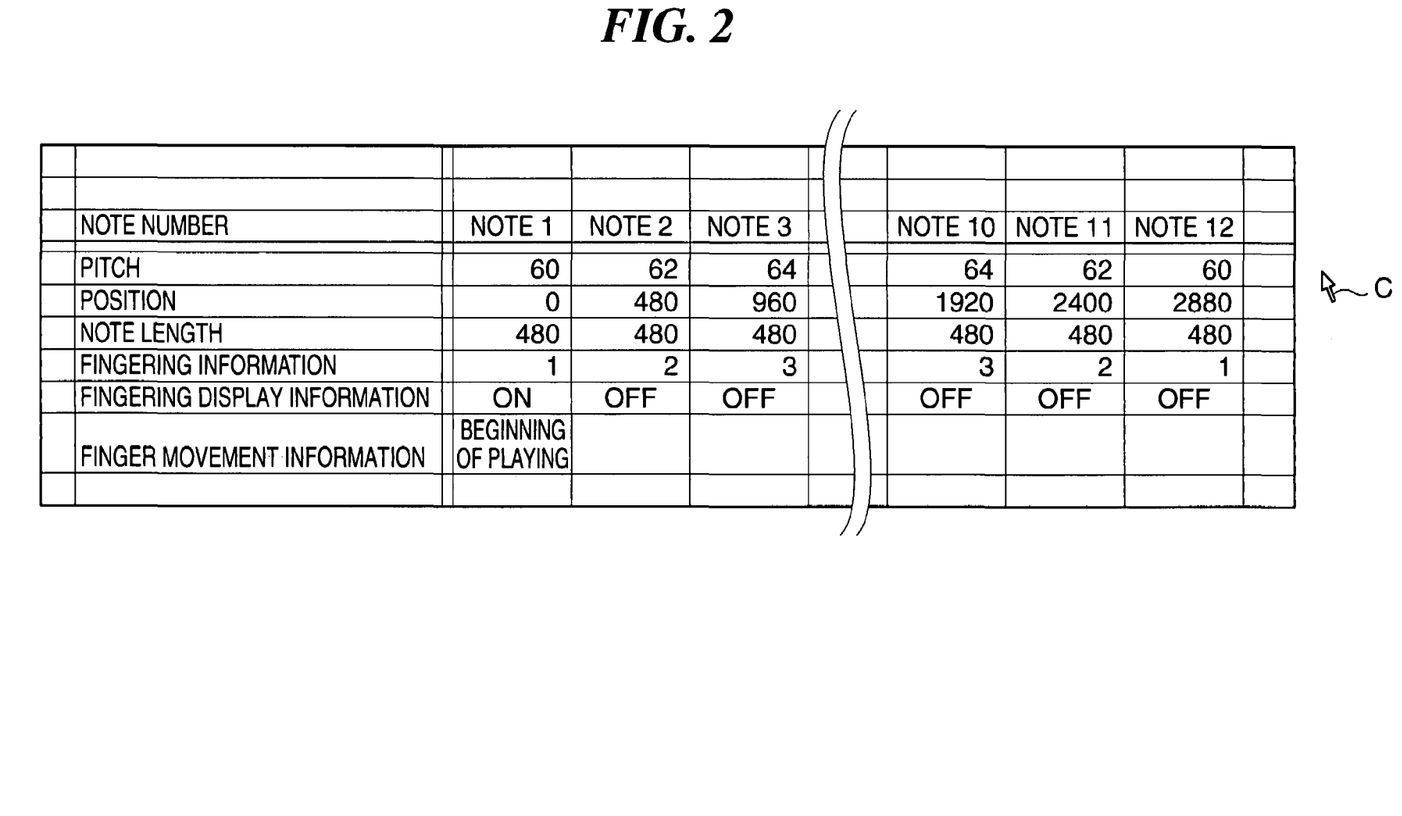
FIG. 2 is a diagram showing an example of a screen that is displayed when score display data generated by a score display data generating process is displayed as it is on a display appearing in FIG. 1 so as to show the contents of the score display data.

The musical information display apparatus according to the present embodiment mainly carries out the following processes:

(1) Score display data generating process
(2) Score display data displaying process FIG. 2 is a diagram showing an example of a screen (dialogue) that is displayed when score display data generated by the above score display data generating process (1) is displayed as it is on the display 7 so as to show the contents of the score display data. It should be noted that the generated score display data is stored in a score display data storage area, not shown, reserved at a predetermined location in the RAM 5, and therefore the screen in FIG. 2 shows contents read out from the score display data storage area in table form.

As shown in FIG. 2, with respect to each note, the score display data is comprised of "pitch", "position" in the direction of the time axis, "note length", "fingering information" indicative of the most suitable finger (number) for operating a performance operator (for example, a piano key) of an actual musical instrument so as to generate a tone of the note, "fingering display information" indicative of whether or not the fingering information is to be displayed on a score (ON/OFF), and "finger movement information" indicative of the type of "finger movement" when the fingering of the note corresponds to any of at least one type of "finger movement" set in advance as "finger movement" that a user would like to detect.

The score display data is generated based on musical composition data selected by the user. The musical composition data is typically comprised of a sequence of a plurality of sets each consisting of event data such as key-on event data, key-off event data, or velocity data, and timing data indicative of reproduction timing of the event data. Each piece of the key-on/key-off event data includes at least data indicative of the pitch, and therefore, the pitch included in the concerned event data (in particular, key-on event data) can be used as it is as the "pitch" of a corresponding note in the score display data. Also, the "note length" of each note can be obtained from the difference between the reproduction timing of the concerned key-on event data and the reproduction timing of key-off event data corresponding to the key-on event data. It should be noted that if the musical composition data is in a key-on event+gate time format, the gate time is used as it is as the "note length". Also, the "position" of each note in the score display data can be easily obtained based on a value obtained by adding values of timing data at the leading end of the concerned musical composition data through the corresponding timing data. In the following description, data on each note, which is comprised of the "pitch", "position", and "note length" in the score display data will be referred to as "note data." Further, if fingering information is included in the selected musical composition data, the included fingering information can be used as it is as the fingering information; on the other hand, if no fingering information is included in the selected musical composition data, a fingering information detecting method is applied to the musical composition data so that fingering information can be automatically detected from the musical composition data and used as the fingering information. It should be noted that the gist of the present invention does not lie in the fingering information detecting method, and hence a known fingering information detecting method can be used. Also, the fingering display information is set to "ON" with respect to note data corresponding to the set "finger movement", and is set to "OFF" with respect to the other note data. The type of "finger movement" is set with respect to "finger movement information" on the note data for which "ON" is set as the fingering display information.

It is configured such that the score display data is automatically generated from musical composition data as described above and then edited on a note to note basis using a cursor C and the keyboard by the user. Of course, the score display data may be manually set from scratch using the cursor C and the keyboard by the user.

Figure 3:
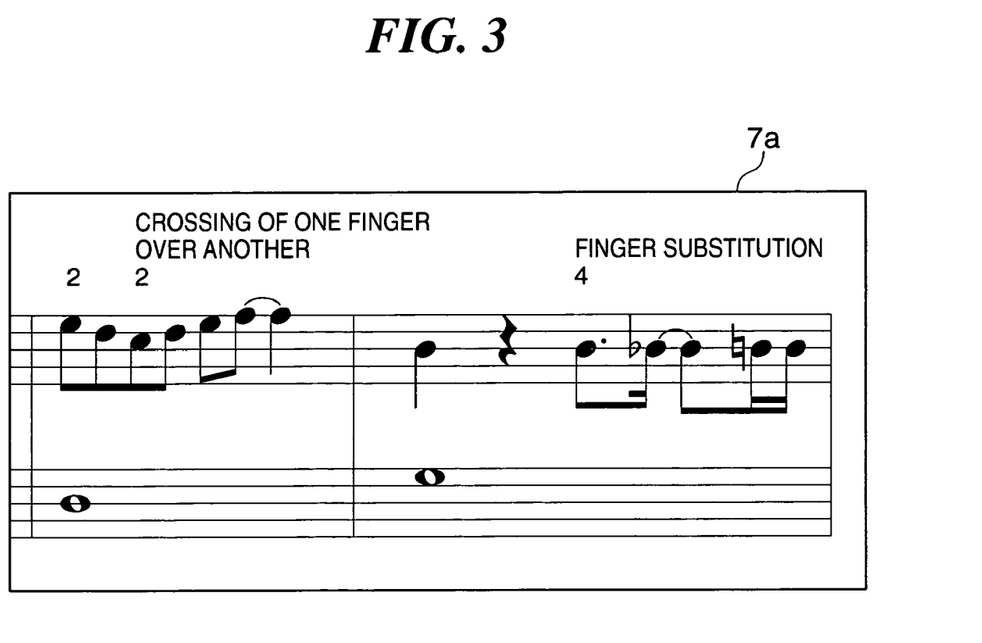
FIG. 3 is a diagram showing an example of a score that is displayed on the display in FIG. 1 by a score display data display process.

FIG. 3 is a diagram showing an example of a score that is displayed on the display 7 by the above score display data display process (2). As shown in FIG. 3, fingering information and finger movement information are displayed with respect to part of notes, i.e. note data for which fingering display information is set to "ON." It should be noted that the score in FIG. 3 is not the one that is displayed based on the above score display data in FIG. 2.

A detailed description will now be given of the control processes.

FIGS. 4A to 5B are flow charts showing the procedure of a score display process carried out by the musical information display apparatus according to the present embodiment, in particular, by the CPU 3. The score display process includes a user setting process (step S1) and a musical composition data selecting process (step S2) in addition to the processes (1) and (2) described above.

In the user setting process, the following settings are made: a setting as to the type(s) of "finger movement" that the user would like to detect (such as crossing of one finger under or over another), a setting as to whether to select a limited display mode in which fingering information is displayed with respect to only notes corresponding to the set type(s) of "finger movement", a setting as to whether to display information indicative of the type(s) of "finger movement" together with fingering information in the case where the limited display mode has been selected, a setting as to a rule indicative of how to determine fingering display information in the case where the limited display mode has not been selected, and a setting as to other information related to a score screen. As a method to make these settings, it can be envisaged that a setting screen, not shown, for setting the above information is displayed on the display 7, and when the user sets targeted information contents on the setting screen, the set information contents are stored in a user setting information storage area, not shown, reserved at a predetermined location in the RAM 5. Of course, the setting method is not limited to this.

In the musical composition data selecting process, various musical composition data stored in the external storage device 6 are displayed in a list on the display 7, and when the user selects any musical composition data from the list, the selected musical composition data is stored in a musical composition data storage area, not shown, reserved at a predetermined location in the RAM 5.

In the score display process according to the present embodiment, the above score display data generating process (1) is comprised of (i) a note data generating process, (ii) a fingering information generating process, (iii) a fingering display information generating process, and (iv) a finger movement information generating process.

Figure 4A:
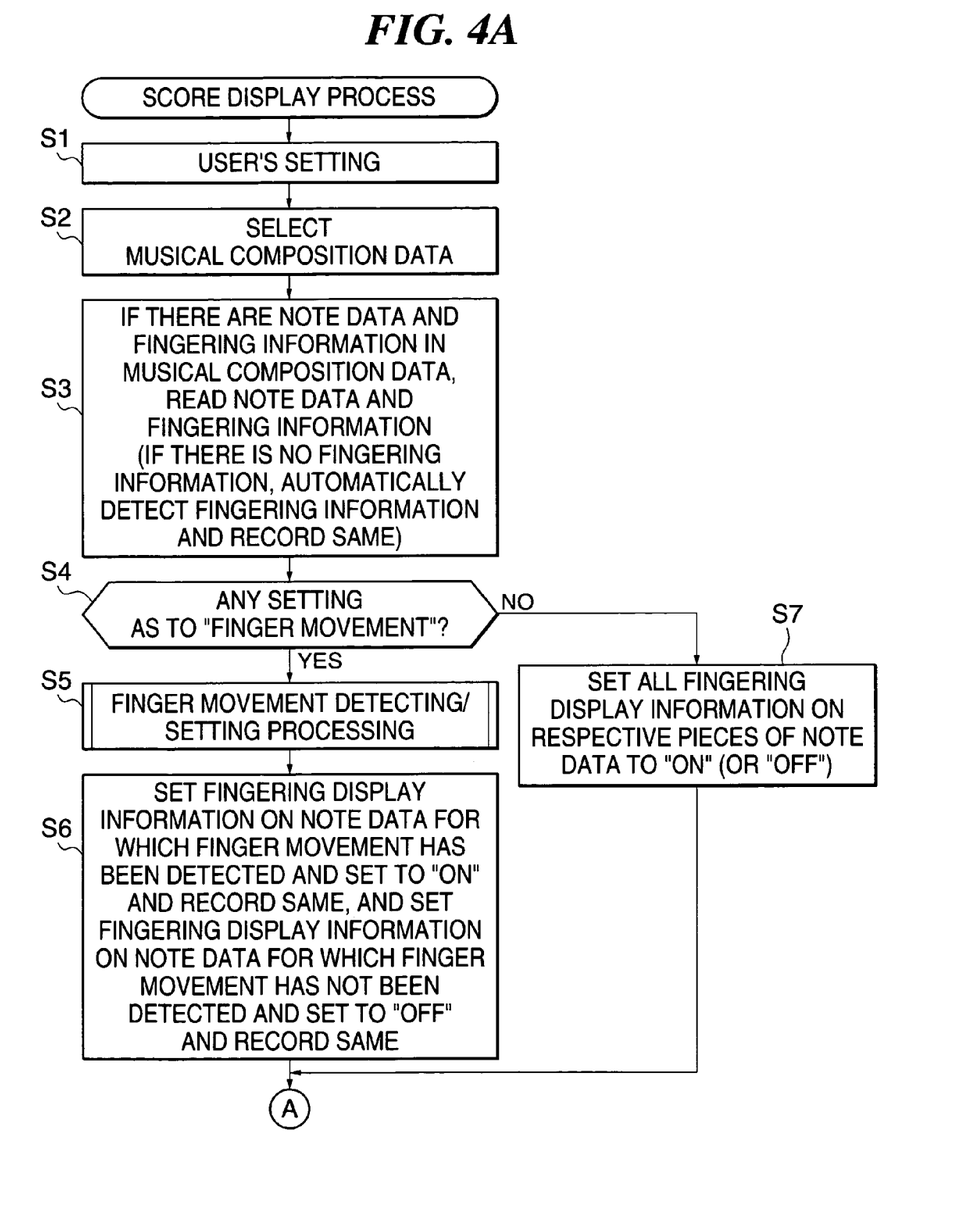
FIGS. 4A and 4B are flow charts showing the procedure of a score display process carried out by the musical information display apparatus in FIG. 1, in particular, by a CPU appearing in FIG. 1.
Figure 4B:
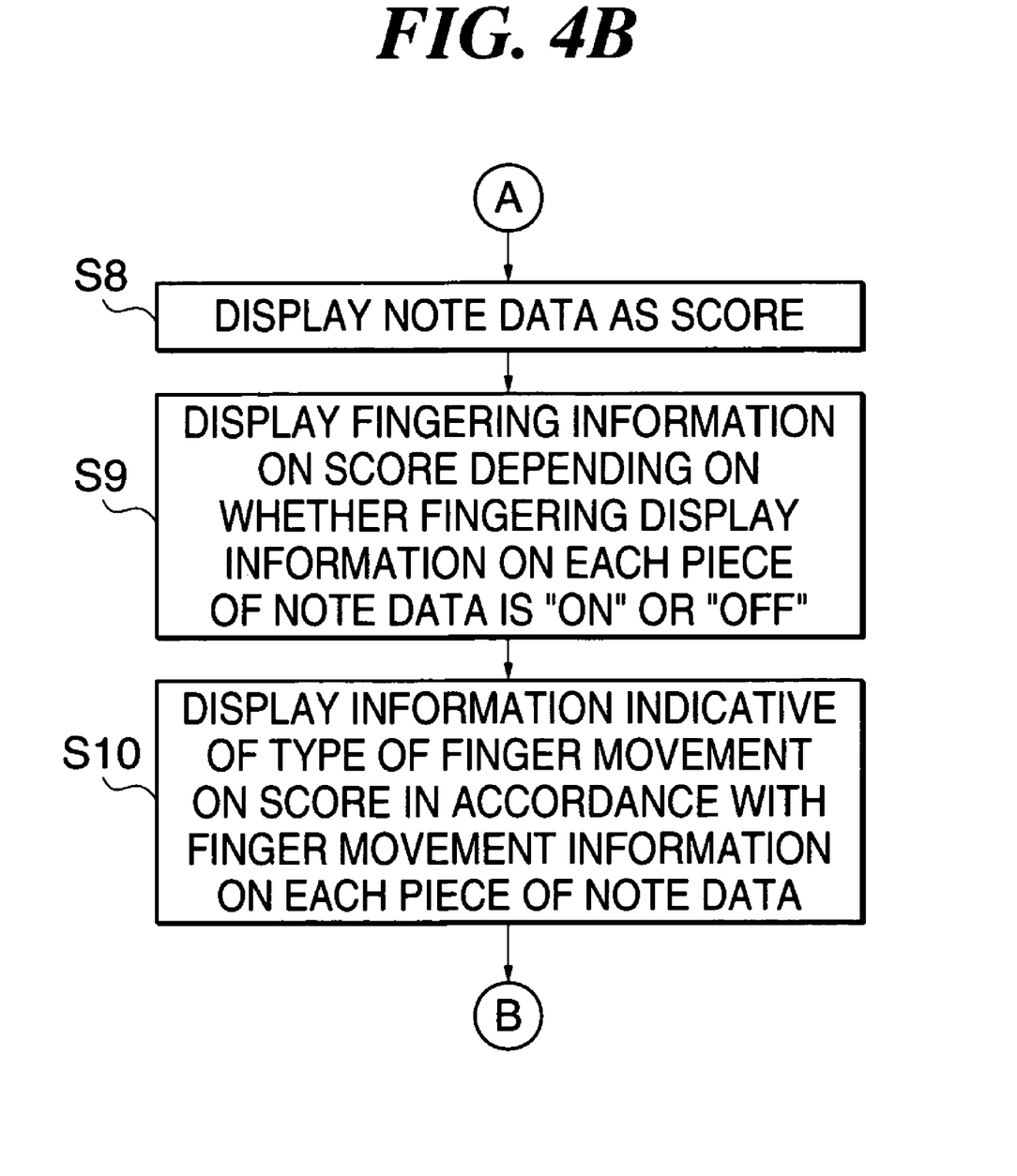

In the note data generating process (i), as described before in the brief description, data based on which note data is to be generated (or data itself that constitutes note data), which is included in the selected musical composition data is read, and note data is generated based on the read data (step S3).

In the fingering information generating process (ii), as described before in the brief description, when the selected musical composition data includes fingering information, the fingering information is read out and recorded as it is, and on the other hand, when the selected musical composition data includes no fingering information, fingering information is automatically detected from the musical composition data by the known fingering information detecting method, and the detected fingering information is recorded (step S3).

The fingering display information generating process (iii) is comprised of an initial stage fingering display information generating process that is initially carried out only once after one or more types of "finger movement" that the user would like to detect are set in the above-mentioned user's setting, and a transitional stage fingering display information generating process that is carried out when the user has changed the type(s) of "finger movement" that he/she would like to detect.

In the initial stage fingering display information generating process, first, a finger movement detecting/setting processing subroutine is executed in which note data corresponding to the set type(s) of "finger movement" is detected based on the generated note data and fingering information, and the corresponding type(s) of "finger movement" is set as "finger movement information" on the note data (step S5).

Figure 6A:
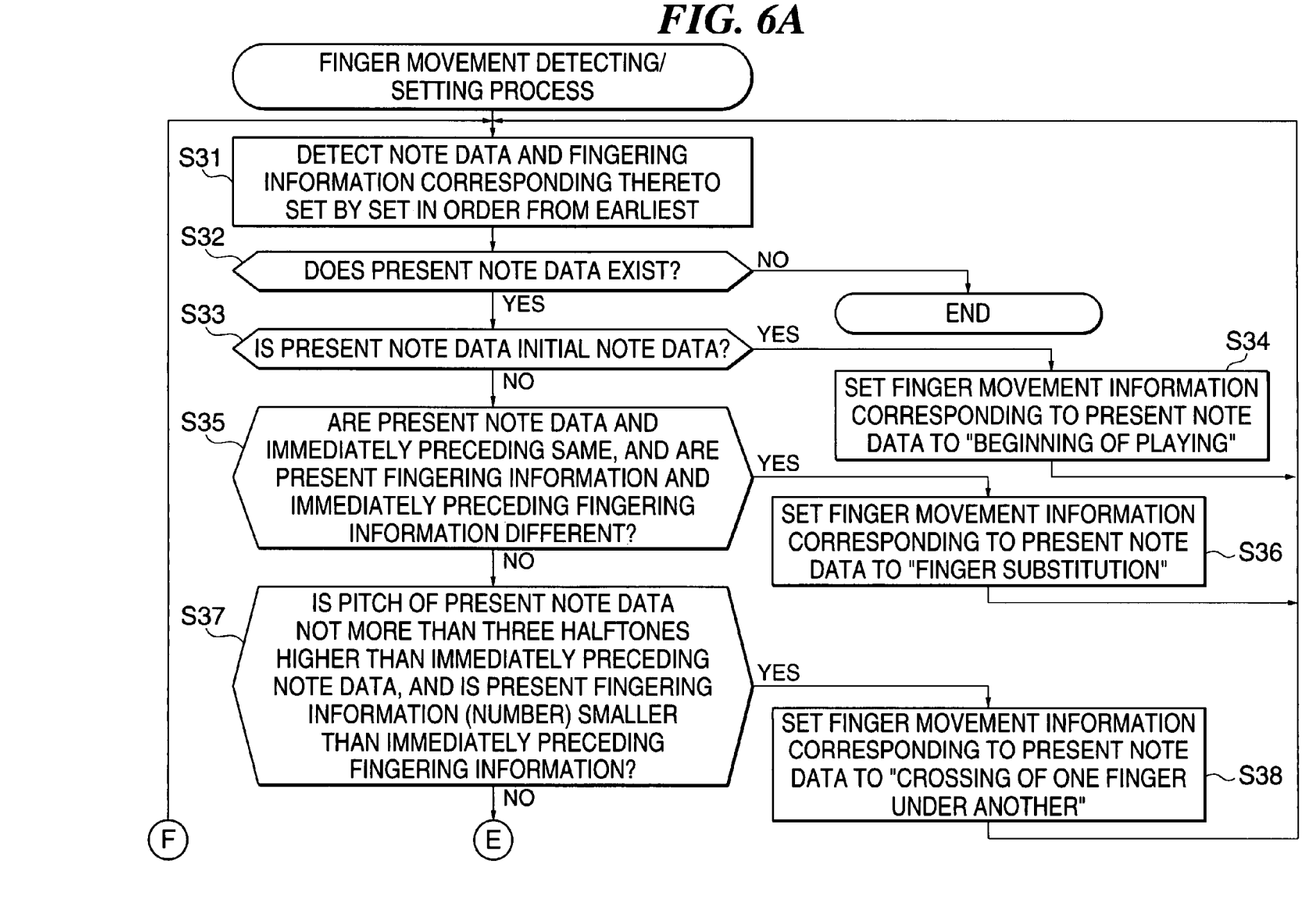
FIGS. 6A and 6B are flow charts showing in detail a finger movement detecting/setting processing subroutine in FIGS. 4A to 5B.
Figure 6B:
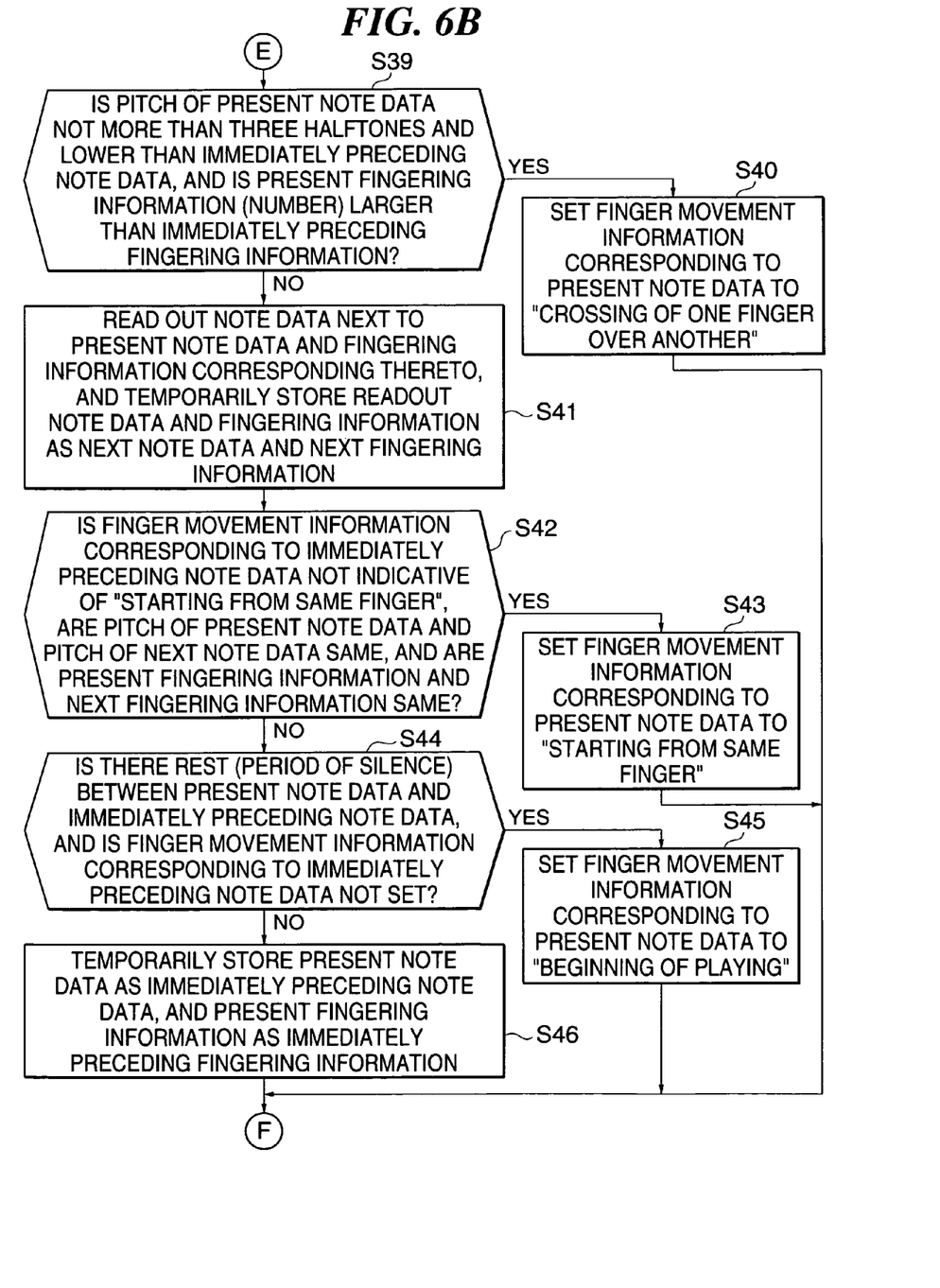

FIGS. 6A and 6B are flow charts showing in detail the procedure of the finger movement detecting/setting processing subroutine.

In the finger movement detecting/setting processing subroutine in FIGS. 6A and 6B, when "beginning of playing", "finger substitution", "crossing of one finger under another", "crossing of one finger over another", and "starting from the same finger" are set as types of "finger movement", note data corresponding to any of these types of "finger movement" is detected. Therefore, in the case where any type(s) of "finger movement" other than the above five types is set, it is impossible to detect note data corresponding to the set type(s) of "finger movement" in the finger movement detecting/setting processing subroutine, and hence the finger movement detecting/setting processing subroutine needs to further include a detecting process in which note data corresponding to the set type(s) of "finger movement" is detected. Also, in the case where not all of the above-mentioned five types of "finger movement" but only part of them is set, a process in which the type(s) of "finger movement" that has not been set is detected needs to be deleted from the finger movement detecting/setting processing subroutine in FIGS. 6A and 6B.

In the finger movement setting/detecting processing subroutine in FIGS. 6A and 6B, note data and fingering information corresponding thereto are detected set by set from the generated note data and fingering information in order from the earliest generation timing. Specifically, when the "present" note data and fingering information satisfy any of conditions listed below, it is determined that the note data corresponds to any of the above-mentioned five types of "finger movement", and "finger movement information" corresponding to the note data is set to the determined type of "finger movement." The conditions are as follows.

Condition A: The present note data is initial note data; "beginning of playing" (steps S33 and S34)

Condition B: The pitch of the present note data and the pitch of note data immediately before the present note data (immediately preceding note data) are the same, and at the same time the present fingering information (finger number) and the immediately preceding fingering information (finger number) are different; "finger substitution" (steps S35 and S36)

Condition C: The difference between the pitch of the present note data and the pitch of the immediately preceding note data is not more than three halftones, the pitch of the present note data is higher than the pitch of the immediately preceding note data, and at the same time the present fingering information (finger number) is smaller than fingering information (finger number) immediately before the present fingering information (immediately preceding fingering information); "crossing of one finger under another" (steps S37 and S38)

Condition D: The difference between the pitch of the present note data and the pitch of the immediately preceding note data is not more than three halftones, the pitch of the present note data is lower than the pitch of the immediately preceding note data, and at the same time the present fingering information (finger number) is larger than the immediately preceding fingering information (finger number); "crossing of one finger over another" (steps S39 and S40)

Condition E: Finger movement information corresponding to the immediately preceding note data is not indicative of "starting from the same finger", the pitch of the present note data and the pitch of the next or immediately following note data are the same, and at the same time the present fingering information and the next fingering information are the same; "starting from the same finger" (steps S42 and S43)

Condition F: There is a rest (interval of silence) between the present note data and the immediately preceding note data, and at the same time no finger movement information is set in association with the immediately preceding note data; "beginning of playing" (steps S44 and S45)

It should be noted that the above conditions (such as numeric values) are only illustrative.

When the finger movement detecting/setting processing subroutine has been executed as described above, the note data are classified into those for which "finger movement" has been detected and set, and those for which "finger movement" has not been detected and set. Then, the fingering display information on the note data for which "finger movement" has been detected and set is set to "ON" and recorded, and on the other hand, the fingering display information on the note data for which "finger movement" has not been detected and set is set to "OFF" and recorded (step S6 in FIG. 4A).

The transitional stage fingering display information generating process corresponds to steps S14 and S15, and the initial stage fingering display information generating process corresponds to the steps S5 and S6 as described above. Since the steps S14 and S15 are identical with the respective steps S5 and S6 in terms of wording, the transitional stage fingering display information generating process and the initial stage fingering display information generating process are substantially the same in processing contents. When the initial stage fingering display information generating process is carried out, at least an area where "finger movement information" is to be set has been cleared from the score display data storage area, and hence in the initial stage fingering display information generating process, the finger movement detecting/setting process described in FIGS. 6A and 6B can be used as it is. However, when the transitional stage fingering display information generating process is carried out, there may be a case where some type of "finger movement" has been set in the area where "finger movement information" is to be set. In this case, at the beginning of or prior to the finger movement detecting/setting processing subroutine in FIGS. 6A and 6B, it is necessary to carry out an additional process in which the area where "finger movement information" is to be set is cleared from the score display data storage area.

In the above score display data display process (2) in the score display process according to the present embodiment, first, the note data in the score display data generated in the above described manner is displayed (step S8). Next, the fingering information is displayed depending on whether the fingering display information is set to "ON" or "OFF" with respect to each piece of the note data (steps S9 and S16), and then information indicative of the type of finger movement is displayed in accordance with the finger movement information with respect to each piece of the note data (steps S10 and S17). It is assumed here that the fingering information is displayed as finger numbers (numbers given to respective fingers). Of course, the present invention is not limited to this, but the fingering information may be displayed as drawings of fingers or the like. Also, it is assumed here that the finger movement information is displayed as character strings representing the types of finger movement, the present invention is not limited to this, but the finger movement information may be displayed as drawings, symbols, or the like representing the types of finger movement.

Figure 5A:
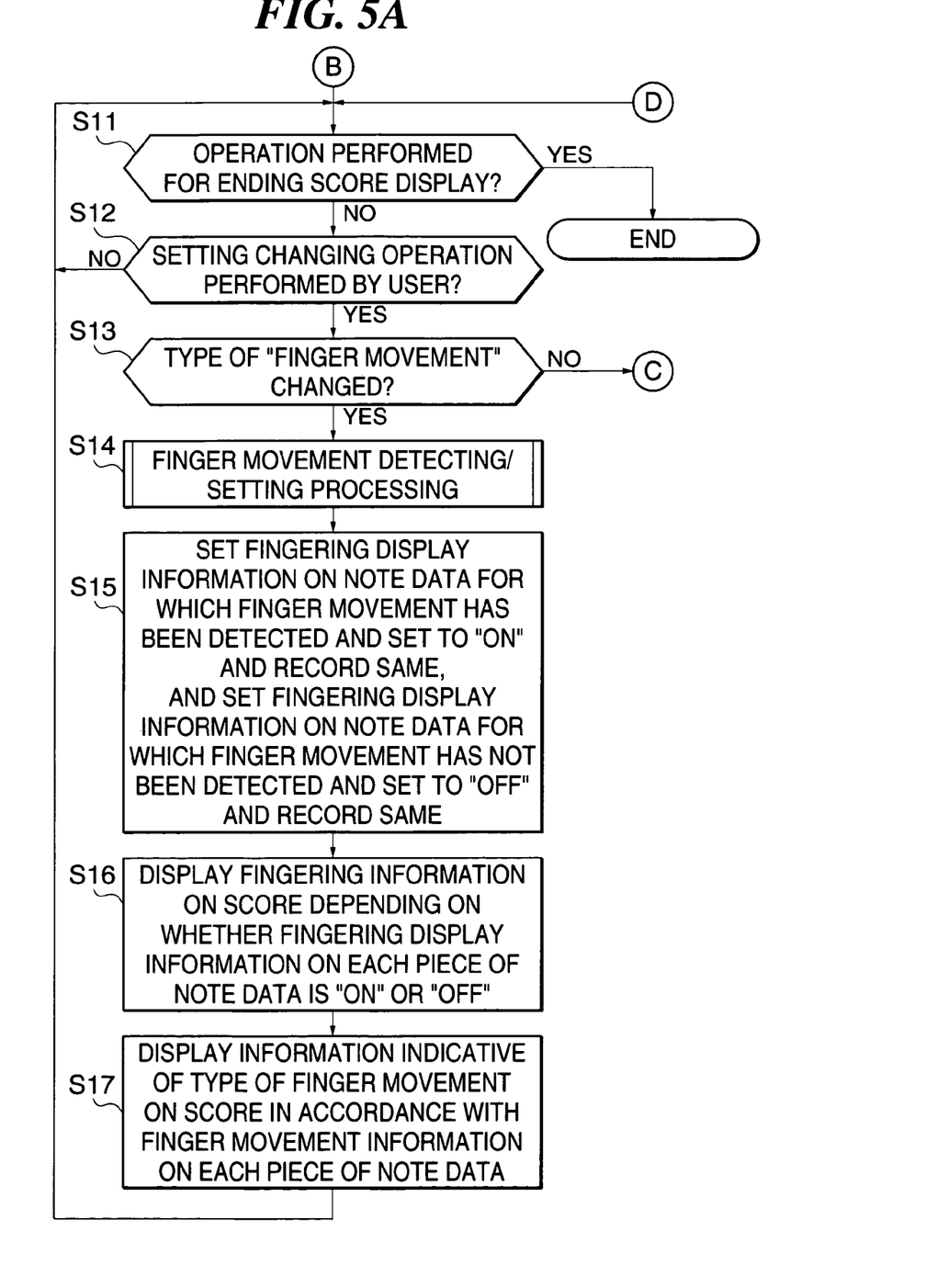
FIGS. 5A and 5B are flow charts showing a continued part of the score display process in FIGS. 4A and 4B.
Figure 5B:
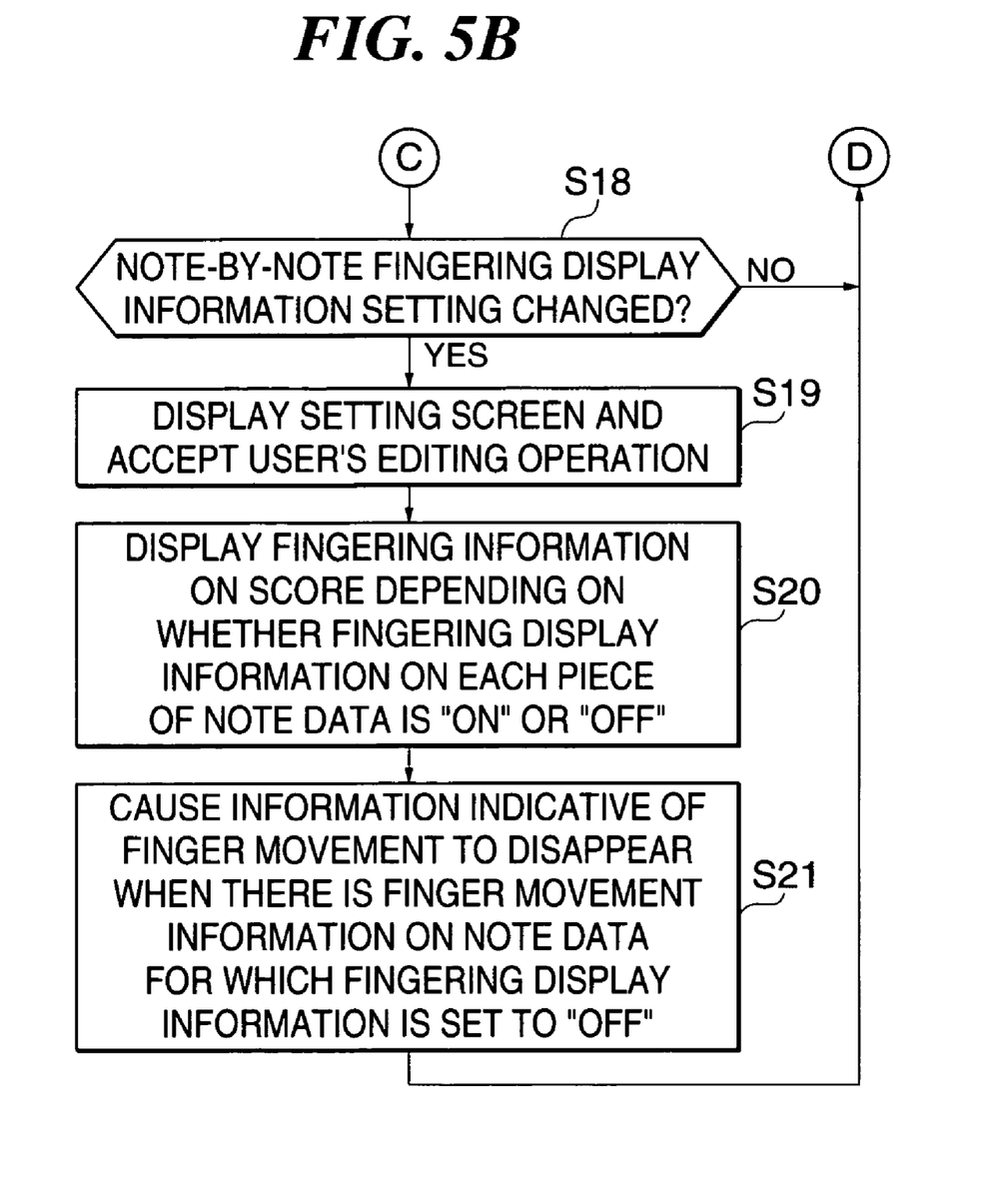

In the present embodiment, it is configured such that the fingering display information can be varied from one note to another as mentioned above. For this reason, in the score display process according to the present embodiment, when a mode in which the fingering display information is varied from one note to another is selected, the above-mentioned setting screen in FIG. 2 is displayed and a user's editing operation is accepted (step S19). Then, fingering information is displayed depending on whether the fingering display information is set to "ON" or "OFF" with respect to each piece of the note data that has been edited (step S20). If there is finger movement information on the note data for which the fingering display information is set to "OFF", the information indicative of the type of finger movement is caused to disappear (step S21).

Also, it is configured such that in the score display process according to the present embodiment, in the case where no "finger movement" that the user would like to detect has been set in the above user's setting, the fingering display information on the respective pieces of the note data are uniformly set to "ON" (or "OFF").

Thus, in the present embodiment, since only a desired part of fingering information corresponding to respective pieces of note data is displayed, fingering information can be additionally displayed such that it can be easy to see. Also, since the type(s) of finger movement is displayed for at least part of the displayed fingering information, the user can understand finger movements at a glance even if he/she is a beginner.

Although in the present embodiment, note data is note-by-note data that is comprised of "pitch", "position", and "note length" in score display data, this is only illustrative for the convenience of explanation; event data included in musical composition data may be used as it is as note data. In this case, however, when the note data is actually displayed as a score, it is necessary to create display data anew.

Further, although in the present embodiment, fingering display information is set to "ON" with respect to note data corresponding to the set type(s) of "finger movement" and is set to "OFF" with respect to the other note data, and fingering information and the type of "finger movement" are displayed for all the note data for which "finger movement" has been detected, the present invention is not limited to this, but it may be configured such that in the case where the detected type of "finger movement" is "starting from the same finger" or the like that is obvious even to the user who is a beginner, only fingering information is displayed but the type of "finger movement" is not displayed. This is the case with the example in FIG. 3. Further, although in the present embodiment, the type of "finger movement" is detected with respect to all the generated note data, the present invention is not limited to this, but the type of "finger movement" may be detected with respect to only part of the generated note data. In this case, part of the note data may be manually selected on a score or a piano roll, which is displayed, by the user, or may be automatically selected according to a predetermined algorithm: For example, note data at the leading ends of bars and immediately after rests are selected.

Also, it may be configured such that only "finger movement" is displayed, or only fingering information is displayed. Further, it may be configured such that the user can determine whether to display only one or both of "finger movement" and fingering information.

Although in the present embodiment, note data is displayed as a score, and fingering information and finger movement information are displayed on the score, the present invention is not limited to this, but it may be configured such that note data is displayed in another form such as a piano roll, and fingering information and finger movement information are displayed on the displayed piano roll or the like.

Further, although in the present embodiment, MIDI data is used as musical composition data based on which a score is to be displayed, any data format may be used, and not performance data but display data may be used.

It is to be understood that the object of the present invention may also be accomplished by supplying a system or an apparatus with a storage medium in which a program code of software, which realizes the functions of the above described embodiment is stored, and causing a computer (or the CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Examples of the storage medium for supplying the program code include a flexible disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded from a server computer via a communication network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing the CPU or the like provided in the expansion board or the expansion unit to perform a part or all of the actual operations based on instructions of the program code.

What is claimed is:

1. A musical information display apparatus comprising:
a storage device that stores score display data including a sequence of musical notes, and both fingering information and fingering displaying information for each of the musical notes, each of the fingering information visually indicating which one of predesignated fingers to play the corresponding musical note, and each of the fingering display information controlling whether to display or hide the corresponding fingering information associated with the corresponding musical note;
a display device for displaying the musical notes; and
a control device configured to control displaying of the fingering information for each of the musical notes for all of the musical notes displayed on the display device,
wherein the fingering display information corresponding to each of the plurality of musical notes comprises one of ON to display or OFF to hide the fingering information of the corresponding note.

2. A musical information display apparatus according to claim 1, further comprising:
a selecting device that selects at least part of musical notes contained in the score display data; and
a fingering display information setting device that sets the fingering display information of all the notes selected by the setting device to ON to display the fingering information corresponding thereto and sets the fingering display information of all the remaining note or notes not selected by the selecting device to OFF to hide the fingering information corresponding thereto.

3. A musical information display apparatus according to claim 1, wherein each of the fingering information is a number corresponding to a predesignated finger displayed above the corresponding musical note.

4. A musical information display apparatus comprising:
a supplying device that supplies a sequence of note data and fingering information, pieces of the fingering information corresponding to respective pieces of the note data;
a display device that displays the note data supplied by said supplying device;
a fingering display information storage device that stores fingering display information indicative of whether to display the fingering information in association with the respective pieces of the supplied note data;
a selecting device that selects part of the supplied note data;
a fingering display information setting device that makes setting such that in the fingering display information, fingering information corresponding to the part of the note data selected by said selecting device is set to "display", and fingering information corresponding to the rest of the note data is set to "not display"; and
a detecting device that detects note data corresponding to at least one performance operator to be operated by at least one predetermined finger movement from the supplied note data and fingering information, and wherein said selecting device selects the note data detected by said detecting device as the part of the note data,
wherein said display device displays the fingering information corresponding to the respective pieces of the displayed note data in accordance with the fingering display information stored in said fingering display information storage device.

5. A musical information display apparatus according to claim 4, further comprising:
a finger movement information storage device that stores finger movement information indicative of movement of a finger that is to operate a performance operator corresponding to each piece of the supplied note data in association with the piece of the supplied note data; and
a finger movement information setting device that sets finger movement information on the note data detected by said detecting device as movement of a concerned finger, and stores the set finger movement information in said finger movement information storage device, and
wherein said display device displays the movement of the concerned finger in association with the note data for which the finger movement information has been set by said finger movement information setting device.

6. A musical information display method comprising the steps of:
storing score display data including a sequence of musical notes, and both fingering information and fingering displaying information for each of the musical notes, each of the fingering information visually indicating which one of predesignated fingers to play the corresponding musical note, and each of the fingering display information controlling whether to display or hide the corresponding fingering information associated with the corresponding musical note;
displaying the musical notes on a display device; and
controlling displaying of the fingering information for each of the musical notes for all of the musical notes displayed on the display device with a control device,
wherein the fingering display information corresponding to each of the plurality of musical notes comprises one of ON to display or OFF to hide the fingering information of the corresponding note.

7. A method according to claim 6, wherein each of the fingering information is a number corresponding to a predesignated finger displayed above the corresponding musical note.

8. A computer-readable medium storing a computer program executable by a computer for displaying musical information on a display device, the computer program including instructions for:
storing score display data including a sequence of musical notes, and both fingering information and fingering displaying information for each of the musical notes, each of the fingering information visually indicating which one of predesignated fingers to play the corresponding musical note, and each of the fingering display information controlling whether to display or hide the corresponding fingering information associated with the corresponding musical note;
displaying the musical notes on the display device; and
controlling displaying of the fingering information for each of the musical notes for all of the musical notes displayed on the display device with a control device,
wherein the fingering display information corresponding to each of the plurality of musical notes comprises one of ON to display or OFF to hide the fingering information of the corresponding note.

9. A computer-readable medium according to claim 8, wherein each of the fingering information is a number corresponding to a predesignated finger displayed above the corresponding musical note.

* * * * *